J. M. LONG.
DEVICE FOR PREVENTING ACCIDENTS ON RAILWAYS.
APPLICATION FILED FEB. 4, 1907.
916,342.
Patented Mar. 23, 1909.
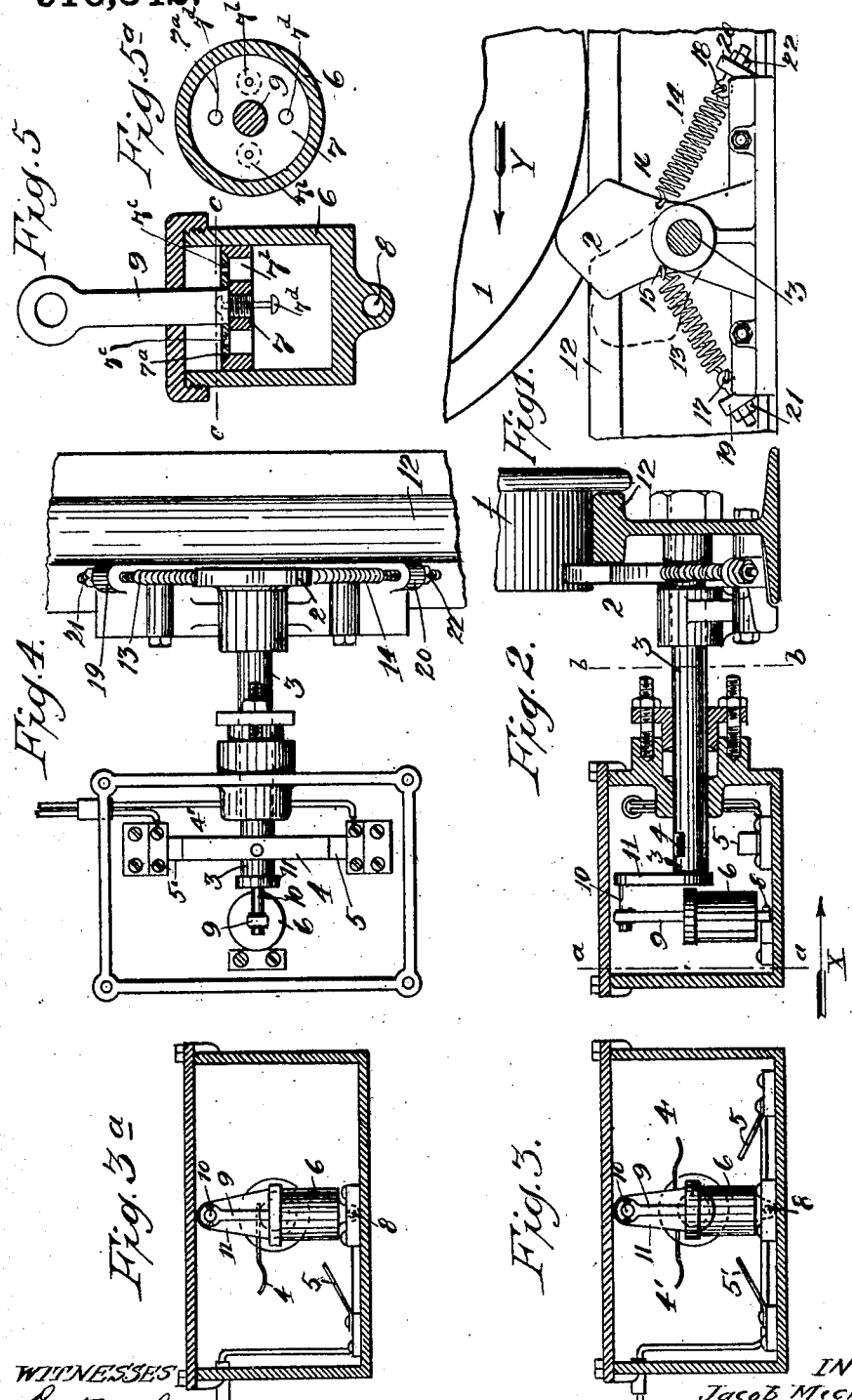
WITNESSES
INVENTOR
Jacob Michael Long
BY John Day
ATTORNEY

UNITED STATES PATENT OFFICE.

JACOB MICHAEL LONG, OF LOS ANGELES, CALIFORNIA.

DEVICE FOR PREVENTING ACCIDENTS ON RAILWAYS.

No. 916,342.   Specification of Letters Patent.   Patented March 23, 1909.

Application filed February 4, 1907. Serial No. 356,273.

*To all whom it may concern:*

Be it known that I, JACOB MICHAEL LONG, of the city of Los Angeles, in the county of Los Angeles, in the State of California, have invented a new or Improved Device for Preventing Accidents on Railways, of which the following is a full, clear, and exact specification, reference being had to the annexed drawings and to the reference letters and numerals marked thereon.

My said invention consists of a device for opening and closing the contacts in circuits of constant current electrically operated railways.

My apparatus is put into action, when a bumper thereon is touched and moved as hereinafter described, by a wheel of a traveling car, or other vehicle, or train of cars, or by a wheel of an electromotive engine, touching and moving, that is to say, imparting movement and pressure thereto.

It is here explained, that with the view of avoiding repetition and for insuring brevity in the subsequent parts of this specification, that whenever the making of contact and movement by the wheels of any kind of vehicle or engine traveling upon a railway is referred to, that the wheel is always to be understood as one of the wheels of a traveling car, or other vehicle, train of cars, or of an electromotive or steam locomotive engine, or a fixed, that is to say, non-rolling mechanical contact maker, carried upon a car, train, electromotive, or locomotive engine.

The device constituting my invention, when the mechanical part thereof is moved by a wheel, operates the electrical part thereof, so as to interrupt or close the operative circuit of an electrically operated line of railway, either a line of railway having overhead conductors as part of the circuit, or what are known as third rails as part of the circuit.

Upon the annexed drawings Figure 1, is a side elevation, and part in section of part of the device constituting my invention, the sectional portion being on the line b, b, Fig. 2, showing the relationship of my device to one of the rails of a railway track, also showing a portion of the tread and flange of a railway vehicle, or engine wheel, by the rolling movement of which upon the rail, the bumper and its co-acting parts are operated. Fig. 2, is an end elevation, partly in section, of the bumper portion of my device arranged for adaptation to either a continuous current single track or double track line of railway, shown completely. Fig. 3, is a transverse section of part of the device constituting my invention on the line a, a, Fig. 2, and looking in the direction of the arrow X, beneath Fig. 2, and arranged for a continuous current electrically operated railway. Fig. 3ª, is another transverse section corresponding to Fig. 3, but showing only two electrical contact pieces instead of four contact-pieces as in Fig. 3, which lesser number of contact-pieces are sufficient for use upon double track electrical railways. Fig. 4, is a plan of the entire mechanical device showing its attachment to the track rail, also the contact-pieces, and the wires leading to the circuits of an opening and closing electrical switch in the operation of a railway. Fig. 5, is a vertical section on a larger scale of a dashpot, forming part of the mechanically operating portion of my device. Fig. 5ª, is a horizontal section on the line c, c, Fig. 5.

When the tread of the wheel 1, of a railway car traveling in one direction passes over the bumper 2, as shown at Figs. 1, and 2, it makes contact therewith and rotates the bumper 2, and the shaft 3, upon which the bumper 2, is carried, causing the bumper 2, and shaft 3, to be rotated downward through an angle in the direction wherein the wheel is traveling. The end of the electrical contact piece 4, (carried by metallic connection upon the shaft 3, as shown at Figs. 2, 3, and 4,) at the same time as the bumper 2, and shaft 3, are moved, is thrown into contact with the end of the contact-pieces 5, and this contact completes a circuit of any electrically operated railway.

In the case of a train of cars passing over the bumper 2, (and to prevent a succession of repetitions of the blows of the several wheels of the cars in succession upon the bumper 2,) I use as an integral part of my apparatus a dashpot 6, having therein a piston 7, as shown in detail, and on a larger scale at Figs. 5, and 5ª. This dashpot 6, is mounted on a pivot 8, Figs. 2, and 3, and the piston rod 9, of the piston 7, is connected to a crank pin 10, fastened in the crank 11, keyed or equivalently secured to the end of the shaft 3, all as shown at Figs. 2, 3, and 4. The dashpot 6, contains oil, and the piston 7, is formed with holes 7ᵇ, as shown in the enlarged views Figs. 5, and 5ª, extending vertically through it, so that when the crank 11, and crank pin 10, are moved by the tread of the wheel 1, moving the bumper 2, into its lowest position, the piston rod 9, and piston 7, being correspondingly moved downward within the dashpot 6, while at the same time the dashpot 6, moves upon its pivot 8, into any angular position corresponding with the movement of the crank pin 10, and crank 11, communicated from the bumper 2, through the rotatable shaft 3. Above the holes 7$^b$, in the piston 7, there is a disk valve 7$^a$, wherein there are two small holes 7$^c$, and the lift of this valve 7$^a$, is limited by the two pins 7$^d$, each of which has a head on either end. The displacement of the oil beneath the piston 7, in the dashpot 6, at the instant the piston 7, is moved downward in the manner hereinbefore described, causes the oil in the lower part of the dashpot 6, to press upward against the valve 7$^a$, and lift the valve, thereby permitting the oil to pass through the holes 7$^b$, in the body of the piston 7, to the upper part of the dashpot, that is to say, to above the piston 7, which transposition of the oil tends to hold down the piston 7, in the lower part of the dashpot 6, and through the connections of the piston 7, namely, the piston rod 9, the crank pin 10, the crank 11, and shaft 3, to maintain the bumper 2, in its lowest position, that is to say, in the position whereinto it is depressed rotatably by the passage over it of the tread of a wheel, or the position shown in dotted lines in Fig. 1, wherein the upper central part or nose of the bumper 2, does not rise above the level of the rail 12. Unless means be provided for returning the piston 7, in the dashpot 6, to its normal position after the several wheels of a train of cars have passed over the bumper 2, the bumper 2, the piston 7, and dashpot 6, would remain in the position wherein these parts are held by the passage of the oil in the dashpot 6, through the holes in the piston 7, to the upper part of the dashpot. This arrangement meets the requirement of avoiding a succession of percussive blows upon the bumper 2, during the passage of the several wheels of a train of cars, but as it is also necessary that after the several wheels of a train of cars have passed over the bumper 2, that the bumper 2, and the rest of the apparatus should automatically return to their normal positions to be in readiness for being operated by one of the wheels of a succeeding traveling car, vehicle, or by a train of cars, or by an electromotive engine, to enable the function of the entire apparatus constituting my invention to be effected at each contact of a wheel of a car, vehicle, or of a train of cars, or of an electromotive engine, my invention is equipped with means for automatically returning the bumper 2, and the connected apparatus hereinbefore described to their normal position. The means which I employ for this purpose consists of spiral springs 13, and 14, respectively, the upper and inner end of each of which springs are fastened into holes 15, and 16, in the bumper 2, as shown at Figs. 1, and 4; the lower ends of the springs 13, and 14, being fastened to eye-bolts 17, and 18, which are again fastened adjustably in the lugs 19, and 20. The eye-bolts 17, and 18, are fitted with screw adjusting set nuts 21, and 22, as shown at Figs. 1, 2, and 4.

When the wheel which strikes the bumper 2, is moving in the direction of the arrow Y, Fig. 1, the bumper 2, is rotated with its shaft 3, and the connections of the said shaft rotate in the same direction as that which the arrow Y, points in, so that the spring 14, is stretched, and the spring 13, has its tension diminished. The effect of the spring 14, being placed in increased tension is to pull the bumper 2, slowly back into its normal position. This pull of the spring 14, being communicated by the connections hereinbefore described, namely, the shaft 3, the crank 11, the crank pin 10, and piston rod 9, to the piston 7, in the dashpot 6, compels the oil situated above the piston 7, as the piston 7, is slowly moved upward by the acting tension of the spring 13, to close the disk valve 7$^c$, down upon the seat in the piston 7, and to permit the oil to be pressed slowly through the small holes 7$^c$, in the valve 7$^a$, to flow through the holes in the piston 7, to the lower part of the dashpot 6, that is to say, into the part thereof which is situated below the piston 7, and in this manner and by these means, the bumper 2, and the entire apparatus operated thereby is returned slowly to its normal position.

With further regard to the device or apparatus constituting my invention, it is explained that when used upon a single track railway it is necessary to construct the device with two contact-pieces 4, and 4', as shown at Figs. 3, and 4, of the annexed drawings, for the reason that the bumper 2, of the device, on a single track railway, is operated in alternate directions by the passage of cars, vehicles, trains, or engines, as these travel in both directions upon the same rails in a single line of railway, whereby it becomes essential that in whichever direction said cars, vehicles, trains, or electromotive engines travel, that the leading wheel of said cars, vehicles, trains, or electromotive engines, shall operate upon the bumper 2, in either direction, and that as these directions are necessarily opposite to each other, it follows that by duplicating the number of contact-pieces 4, and 4', and providing two contact-pieces 5, and 5', as shown in Figs. 3, and 4, instead of one as shown in Fig. 3$^a$, the current will be diverted by means of either contact through the electrical current which my apparatus operates to open or close. It may also sometimes be necessary in order to allow a car or other railway vehicle, train or electromotive engine, to run backward a short distance on a double track railway after my device or apparatus has operated to close a circuit, to use my device with the double contacts hereinbefore described with reference to Figs. 2, 3, and 4, but unless the backing operation, such as is now herein referred to, be essential, it is not necessary in such case to use more than one pair of contacts, either 4, 4', or 5, 5', in the apparatus shown and hereinbefore described with reference to Figs. 2, 3, and 4, on a double track railway. This part of the device as constructed with a single pair of contacts only, is shown at Fig. 3ª, and it is operated by the bumper device in all other respects precisely as the operation of such bumper device is already described with reference to Figs. 2, 3, and 4.

As shown at Figs. 2, 3, 3ª, and 4, the end of the rotatable shaft operated by the bumper, also the electrical contact-pieces carried upon the bumper shaft, the crank, the crank pin, the piston and piston rod, and dashpot, are indicated as being contained within a box or chamber which is not necessarily of any special construction, and which may be made of iron, timber, or other suitable material, and by preference filled with oil.

I claim as my invention.

1. A device comprising a bumper upon a rotatable shaft, said rotatable shaft being in mechanical and electrical operative union with one of the rails forming part of the main circuit of a railway operated by continuous electrical current, an electrical contact piece upon said rotatable shaft, said contact piece alternately making and breaking contact with an open terminal of an electrical circuit, slowly operating springs for restoring the bumper, its connected parts, and the electrical contact piece to their normal position, the whole adapted to be set into operation by mechanical contact and movement with pressure of part of a traveling car, vehicle, train, and locomotive engine with said bumper.

2. A device comprising a bumper upon a rotatable shaft, said rotatable shaft being in both mechanical and electrical operative union with one of the rails forming part of the circuit of a railway operated by continuous electrical current, an electrical contact piece upon said rotatable shaft operating to alternately make and break contact with an open terminal of the main electrical circuit of such continuous current railway, slowly operating springs for automatically restoring the bumper and its connected parts to the normal position, after being moved out of their normal position by a traveling car, vehicle, train and electromotive engine.

3. A device comprising a bumper upon a rotatable shaft, said rotatable shaft being in both mechanical and electrical operative union with one of the rails forming part of the main circuit of a railway operated by continuous electrical current, an electrical contact piece on said rotatable shaft, said contact piece alternately making and breaking contact with an open terminal of an electrical circuit, springs for restoring the bumper and the contact piece to their normal position, a pivoted dash-pot, a piston and piston rod in said dash-pot, a piston with openings therein, a piston rod, an opening and closing valve above the openings in said piston, said valve's openings of less area than the area of the openings in the piston, liquid in said dash-pot, the whole device adapted to be set into operation by mechanical contact and movement with pressure, of a wheel and equivalent part of a traveling engine, car, vehicle, and train upon said bumper.

In testimony whereof, I have hereunto set my hand and seal at the city of Los Angeles aforesaid, in the presence of two subscribing witnesses.

JACOB MICHAEL LONG. [L. S.]

Witnesses:
 ST. JOHN DAY,
 J. D. CORY.